US012749599B2

(12) United States Patent
Carrolo et al.

(10) Patent No.: US 12,749,599 B2
(45) Date of Patent: Sep. 29, 2026

(54) CABLE HARNESS MANUFACTURING SYSTEM AND A KIT OF PARTS AND TOOLING COMPONENTS FOR USE WITH AN ASSEMBLY BOARD IN CABLE HARNESS MANUFACTURING APPLICATIONS

(71) Applicant: Aptiv Manufacturing Management Services GmbH, Schaffhausen (CH)

(72) Inventors: Nuno Carrolo, Lisbon (PT); João Bernardo Pires Afonso Bispo, Corroios (PT); Ricardo Tavares Correia Rosado, Lisbon (PT); Pedro Matias, Lisbon (PT)

(73) Assignee: Aptiv Manufacturing Management Services GmbH, Schaffhausen (CH)

( * ) Notice: Subject to any disclaimer, the term of this patent is extended or adjusted under 35 U.S.C. 154(b) by 675 days.

(21) Appl. No.: 18/112,820

(22) Filed: Feb. 22, 2023

(65) Prior Publication Data

US 2023/0268101 A1 Aug. 24, 2023

(30) Foreign Application Priority Data

Feb. 24, 2022 (GB) ..................................... 2202517

(51) Int. Cl.
*H01B 13/012* (2006.01)
*H01B 7/00* (2006.01)

(52) U.S. Cl.
CPC ..... *H01B 13/01227* (2013.01); *H01B 7/0045* (2013.01); *H01B 13/01209* (2013.01)

(58) Field of Classification Search
CPC ............ H01B 13/01227; H01B 7/0045; H01B 13/01209; H01B 13/012; H01B 13/01218
See application file for complete search history.

(56) References Cited

U.S. PATENT DOCUMENTS 9,128,668 B2 * 9/2015 Johnson ............... F16M 11/105
2010/0146697 A1 * 6/2010 Roth ..................... F16B 47/006
4/577.1

(Continued)

FOREIGN PATENT DOCUMENTS

CN 205247988 U * 5/2016
CN 205438288 U * 8/2016

(Continued)

OTHER PUBLICATIONS

UKIPO search report for Application No. GB2202517.5; mailed May 10, 2022; 4 pages.

*Primary Examiner* — Thomas J Hong
*Assistant Examiner* — Jose K Abraham
(74) *Attorney, Agent, or Firm* — Billion & Armitage

(57) ABSTRACT

A routing element for a cable harness manufacturing system includes an assembly board having an attachment surface configured for receiving tooling components to support and locate a cable harness during manufacture. The routing element includes: an upper fixture support having an aperture for receiving a tooling component to support the cable harness during manufacture; and a lower suction holder including two suction cups for attaching the routing element to the assembly board. The lower suction holder and the upper fixture support are located axially about a central vertical axis of the routing element. The lower suction holder extends outwardly relative to the upper fixture support, such that the area covered by the lower suction holder is greater than that of the upper fixture support. Also provided is a cable harness manufacturing system and a kit including routing elements, spacer elements and support plates for a cable harness assembly board.

17 Claims, 12 Drawing Sheets

(56) References Cited

U.S. PATENT DOCUMENTS

| | | | | |
|---|---|---|---|---|
| 2016/0064121 | A1* | 3/2016 | Rougier | H01B 13/01236 29/748 |
| 2016/0108954 | A1* | 4/2016 | Chen | F16M 11/041 248/205.8 |
| 2018/0366244 | A1 | 12/2018 | Rougier et al. | |
| 2021/0197739 | A1* | 7/2021 | Okaniwa | H02G 3/30 |

FOREIGN PATENT DOCUMENTS

| | | | | | |
|---|---|---|---|---|---|
| CN | 213459219 | U | | 6/2021 | |
| CN | 215036856 | U | * | 12/2021 | |
| DE | 102015112722 | A1 | * | 2/2017 | H01B 13/01227 |
| EP | 3273449 | A1 | | 1/2018 | |
| JP | 2012159195 | A | * | 8/2012 | B65G 49/061 |
| KR | 20210087607 | A | * | 7/2021 | H01B 13/01209 |

* cited by examiner

CABLE HARNESS MANUFACTURING SYSTEM AND A KIT OF PARTS AND TOOLING COMPONENTS FOR USE WITH AN ASSEMBLY BOARD IN CABLE HARNESS MANUFACTURING APPLICATIONS

CROSS-REFERENCE TO RELATED APPLICATION

This application claims benefit of priority to United Kingdom Patent Application No. GB 2202517.5 filed on Feb. 24, 2022, the entire disclosure of which is hereby incorporated by reference.

TECHNICAL FIELD OF THE INVENTION

The present disclosure generally relates to tooling components and systems for cable harness or wire harness manufacturing.

BACKGROUND

Cable harness manufacturing is often a complex operation, which reflects the complexity of the cable harnesses currently in use, including for example in electric vehicles. The cables of the harness are for example wires, electrical cables, optical fibres or other cables, the harness will also typically include connectors connected by cables of the harness. An example of a known wiring harness production system is described for example in WO 2014/181060. The arrangement described therein provides an assembly board having attachment surface for receiving cable routing elements and for routing cables in proximity to the attachment surface.

As cable harness manufacturing becomes ever more complex, there is a need for a system that can accommodate the greater size and complexity of components and cables required for cable harness manufacture while providing for sufficient user access to all portions of the cable harness. Therefore, there is a need to provide improved tooling components and improved cable harness manufacturing system that are adjustable and extendable to take account of the increasing variety, size requirements, and complexity of cable harnesses and allows flexibility in the location of cable fixing elements to support manufacture of different cable types.

SUMMARY

According to embodiments of a first aspect, there is provided a routing element for use in a cable harness manufacturing system which includes an assembly board having an attachment surface configured for receiving tooling components to support and locate a cable harness during manufacture. The routing element includes an upper fixture support having at least one aperture for receiving a tooling component to support the cable harness during manufacture and a lower suction holder including at least two suction cups for attaching the routing element to the assembly board. The lower suction holder and the upper fixture support are located axially about a central vertical axis of the routing element. The lower suction holder extends outwardly relative to the upper fixture support, such that the area covered by the lower suction holder is greater than that of the upper fixture support. The arrangement advantageously provides for secure attachment of the routing element at the assembly board. Further, it provides high levels of stability for the tooling components and the supported cable harness. Routing elements according to the specification have an increased surface contact area at the assembly board due to the multiple suction cups. The use of multiple suction cups provides an increased suction force. The suction cups work in combination to provide secure attachment. The combination of features of the routing elements facilitates use at an assembly board arranged at an angle to the horizontal. A footprint of the upper fixture support portion is less than that of the lower suction holder portion which provides stability at the support as the loads are supported centrally of the lower suction holder of the routing element to the board.

According to an embodiment of the first aspect, each suction cup includes a housing having a peripheral side wall extending between an upper surface and a lower surface edge defining a contact surface which is use is configured to contact the assembly board, the peripheral side walls having a generally cylindrical form arranged substantially perpendicular to the assembly board. According to an embodiment of the first aspect, each suction cup includes a suction element (not shown) located in the housing and moveable therein, wherein the housing is configured to provide support and stability to the suction element. The sidewalls extend in a direction substantially perpendicular to the assembly board in use and accordingly the suction cups and the suction holder portion have an improved resistance to tilting. The housing provides excellent support for the suction cup.

According to an embodiment of the first aspect, each suction cup includes an actuator for operating the suction cup, the actuator configured such that movement thereof affects movement of the suction element to activate or deactivate a vacuum force at the attachment surface.

According to an embodiment of the first aspect, the actuator includes a lever or rotatable actuator, and the actuator is located integrally at the support of the routing element. The actuator may be a lever or may be rotatable depending also on space available and preferences for ease of operation. The actuator is arranged for ease of access by the user. The arrangement is compact.

According to an alternative embodiment, the suction cup may be actuated using a vacuum system.

According to an embodiment of the first aspect, the lower suction holder and the upper fixture support of the routing element are integrally formed. According to an embodiment of the first aspect, a portion of the support is located between the at least two suction cups, the suction cups being spaced apart about the support. A portion of the support may be located between the at least two suction cups of the suction holder, the suction cups being spaced apart about the support. Such arrangement allows for an increased footprint of the lower suction portion of the routing element at the assembly board relative to the upper fixture support further contributing to stability at the assembly board and at the supported cable harness.

According to an embodiment of the first aspect, the routing element includes two suction cups arranged at opposing sides of the central vertical axis and the support of the routing element.

According to an embodiment of the first aspect, the routing element includes three suction cups, equally spaced apart about the central vertical axis and the support of the routing element. The suction cups are equally spaced apart around the central axis and the support provides a compact and symmetrical device. The suction strength increases proportionally with the number of suction cups depending on load requirements. Advantageously the routing elements of the specification are also suitable for use with an assembly board arranged at an incline to the horizontal due to the increased suction strength.

According to an embodiment of the first aspect, the routing element includes one or more guide features defining a guide for orientation or alignment of the routing element. The one or more guide features may include one or more of: markers, fiducial marks, integrally formed guide features, a reflective coating, a reflective material, and a reflective marker. The provision of integrated guide features supports Increased ease in identifying orientation of and for controlling orientation of the routing elements and apertures. The guide features also support an improved accuracy in alignment with other components including by indicating the longitudinal axis of the device. Allows validation of the orientation and correction of any misalignment. In addition, use of a reflective coating, a reflective material, or a reflective marker advantageously provides an increased visibility/ease of detection by the user and machine vision system the light reflecting surface is activated upon receiving a signal from a vision system.

According to an embodiment of the first aspect at least a portion of the upper fixture support or the lower suction portion is formed of a translucent or at least partially transparent material. The provision of a routing element having at least portions formed of a material that is translucent or at least partially transparent allows for improved user visibility of the assembly board or in the event that the assembly board is a digital assembly board of displayed data.

According to an embodiment of the first aspect, the routing element further includes one or more recesses configured for receiving a portion of a suction cup of another routing element, the recess defined by a portion of each of the side walls of two adjacent suction cups and a recess retainer wall portion of the upper fixture support. The recess is configured to accommodate an adjacent suction cup allowing for co-location and support of suction cups of other routing elements. This provides for maximizing use of the space at the assembly board.

According to a second aspect of the specification, there is provided a routing element for use in a cable harness manufacturing system including an assembly board having an attachment surface configured for receiving one or more tooling components to support and locate a cable harness during manufacture. The routing element includes an upper fixture support having at least one aperture for receiving a tooling component and a lower suction holder including a least one suction cup for attaching the routing element to the assembly board. The suction cup includes a housing. A suction element for applying a suction force to the attachment surface is located in the housing and moveable therein. The housing has a peripheral side wall that extends between an upper surface and lower surface edge of the suction cup. The lower surface edge defines a contact surface of the routing element for contacting the assembly board. The peripheral side wall has a generally cylindrical form configured in use to extend in a direction substantially perpendicular to the attachment surface and configured to support the suction element and to prevent tilting of the suction element relative to the attachment surface. By virtue of the arrangement of the upper fixture support and the housing, the routing element provides improved stability for attachment to the assembly board and for the supporting tooling component. The arrangement is advantageously compact and provides good stability. The configuration of the side wall of the suction cup and the suction element reduces any tilting movement in the suction cup but allows some turning.

According to an embodiment of the second aspect, the routing element includes one or more guide features configured to provide a guide for orientation and alignment of the routing element.

According to an embodiment of the second aspect, the routing element is configured such that the distance between the position of the upper fixture support and the lower suction holder is adjustable.

According to an embodiment of the second aspect the routing element further includes a vacuum activation means for activating or deactivating the suction element, wherein the vacuum activation means is located on the support.

According to a third aspect there is provided a cable harness manufacturing system including an assembly board and one or more tooling components. The assembly board has an attachment surface that is configured for receiving the one or more tooling components to support and locate a cable harness during manufacture. The one or more tooling components include a routing element as described above or according to arrangements of the specification. The system provides for improved stability for attachment of tooling components at the assembly board and therein improved ease of use. The system may further include a support plate having an upper cable harness facing surface and lower assembly board facing surface. The support plate includes a plurality of apertures that extend between the upper and lower surfaces thereof. The apertures are configured to receive and support a cable fixing element. The support plate is configured for coupling to one or more routing elements and is further configured to be arranged in use in a plane generally parallel to the plane of the assembly board.

According to an embodiment of the third aspect, the upper and lower surfaces of the support plate have a generally rectangular form and include tapered ends at the longitudinal ends. The tapered ends are configured for connection at one or more routing elements. According to an embodiment of the third aspect, support plates may be of a generally square or rectangular form. The support plate defines an extended support having a plurality of apertures for receiving cable fixing elements. Support plates may be used together with one or more routing elements and advantageously are configured in use to provide a support for receiving cable fixing elements at locations between routing elements. The support plates are configured for use in applications where a high density of cable holders or fixing elements is required. The support plates may be arranged between routing elements, such that the support plate is spaced apart from the attachment surface. The routing elements may include engaging or locating features, for example protrusions receivable in the support plate or locator walls that define a receiver or stop for the support plate. The routing elements are configured for receiving and coupling to one or more support plates. The ends of the support plate may be tapered to allow clearance for connection at an aperture or protrusion of the routing element. The support plate may be formed of a metal or a polymer material. The support plate may be configured to be one or more of: translucent, at least partially transparent, and transparent. The support plate is configured by selection of the material, depth and form of the support plate to have strength sufficient to stably support tooling components and the cable harness. In addition, the support plate may be formed of a material having translucent or transparent properties to allow the user to have clear visibility of the assembly board.

The system may further include a spacing element incorporating a support having an upper receiver and two support legs. The support legs have first ends connectable to the support such that the receiver is located therebetween and second ends receivable in first and second apertures of a routing element or a support plate. The receiver is configured to receive a body clip. According to an embodiment, the spacing element may be adjustable to allow variation of the distance between the receiver and the first and second ends of the support legs and accordingly to adjust the distance between the receiver and the assembly board. Advantageously, such spacing elements are lightweight and compact and may be used between and in conjunction with routing elements. The spacing element allows adjustment of the separation between the assembly board and the cable harness supported thereon facilitating user access to the harness from all sides.

In arrangements of the specification, the assembly board may include a digital assembly board including a display configured to display data relevant to the cable harness manufacturing process, the attachment surface being associated with the display. The assembly board may be configured for positioning at any of a range of angles relative to the horizontal, for ease of use and access.

According to a fourth aspect of the specification, there is provided a kit for use in a cable harness manufacturing system including an assembly board, having an attachment surface configured for receiving tooling components to support and locate a cable harness during manufacture. The kit contains one or more routing elements according to arrangements described above and of the specification and one or more support plates. The one or more routing elements include a support having a least one receiver for a tooling component for supporting the cable harness during manufacture, a lower attachment holder including a least one suction cup for attaching the routing element to the assembly board, an orientation guide, one or more mating features for receiving and locating one or more routing elements and/or for receiving and locating one or more support plates. The one more support plates are configured to be connected to one or more routing elements to locate the support plate in use in a plane parallel to that of the attachment surface and spaced apart therefrom. The support plate includes a plurality of apertures configured to receive one or more tooling components and for connection to a receiver of a routing element.

Overall, the specification advantageously provides a system and kit that allow use of a workspace at the assembly board that has an increased useable volume in comparison with that of prior art arrangements. Further the combination of features of the system of the specification provides increased security and stability for the process of manufacture and for the cable harness during manufacture.

BRIEF DESCRIPTION OF THE DRAWINGS

The present invention is now described, by way of example with reference to the accompanying drawings, in which:

With reference to FIG. 5, a spacer element according to an arrangement of the specification is also shown, the spacer element allows for the adjustment of the separation between a support and the assembly board, to allow adjustment of the vertical position of cable fixing elements such as cable forks or cable holders relative to the assembly board;

FIGS. *6a*, *6b* and *6c* provide perspective view of support plates according to some embodiments. The fixture support elements are of elongated form and the surfaces thereof have a plurality of holes of receiving one or more cable fixing elements such as cable forks or cable holders.

DETAILED DESCRIPTION

Figure 1:
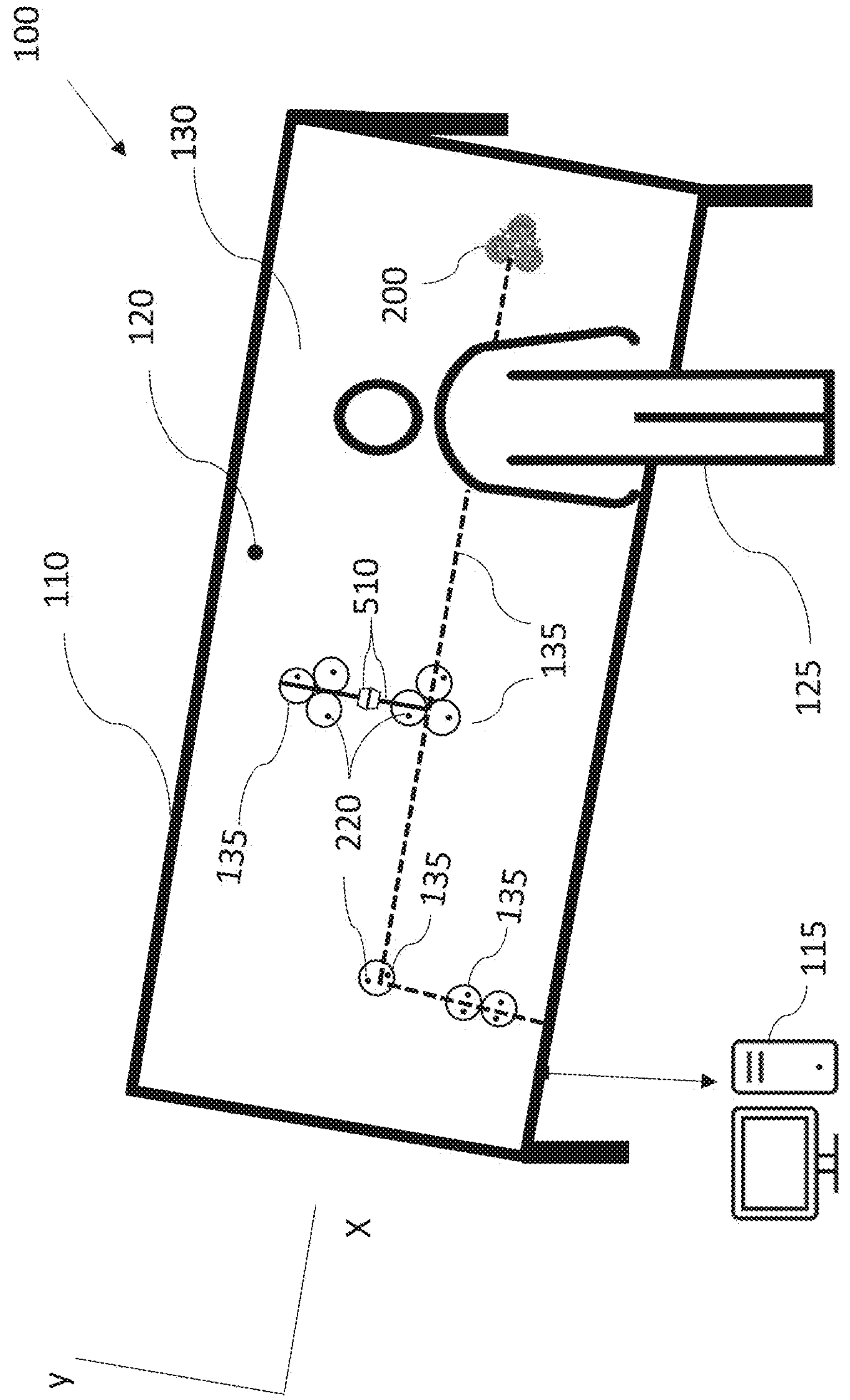
FIG. 1 is a perspective view of an electric harness manufacturing system according to some embodiments.

The following discussion provides many embodiments of the inventive subject matter. Although each embodiment represents a single combination of inventive elements, the inventive subject matter is considered to include all possible combinations of the disclosed elements. Thus, if one embodiment includes elements A, B, and C, and a second embodiment includes elements B and D, then the inventive subject matter is also considered to include other remaining combinations of A, B, C, or D, even if not explicitly disclosed.

For simplicity and clarity of illustration, reference numerals may be repeated among the Figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limiting to the scope of the examples described herein.

A cable harness manufacturing system 100 according to specification is described with reference to the Figures and initially in particular with reference to FIGS. 1 and 2.

The cable harness manufacturing system 100 includes an assembly board 110 having an upper surface 120 for receiving tooling components 200. The surface 120 defines an attachment surface on which the tooling components are located and to which they are attached. The tooling components 200 are used for routing cables of the cable harness assembly during manufacture and include components for supporting and locating the cables during manufacture such as cable forks, body clips, cable holders, which typically have a lower or proximal end portion which in use is located near the assembly board and an upper or distal end portion that in use is arranged to contact the cables of the harness and to support or hold them in the assembly field at the assembly.

Figure 2:
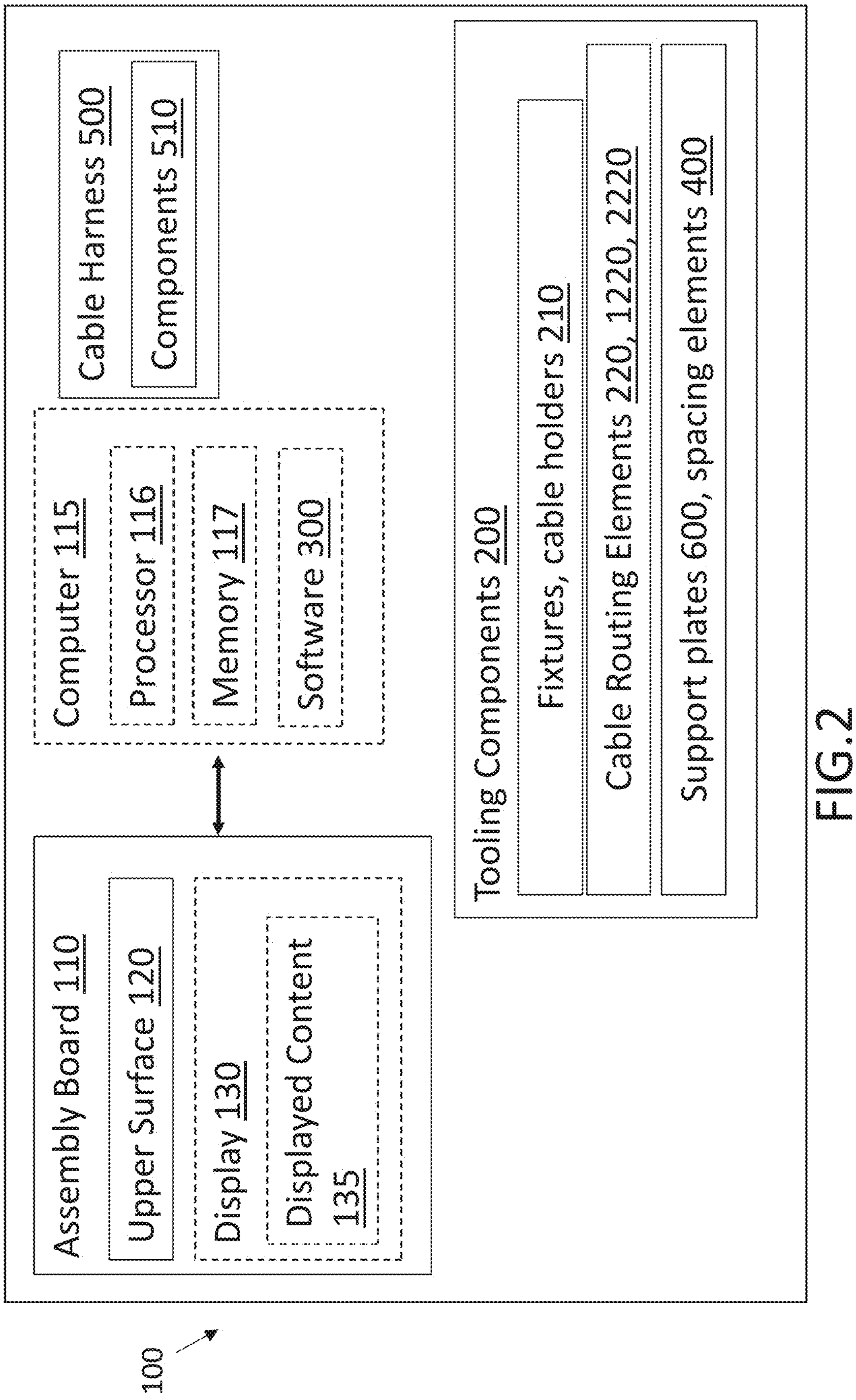
FIG. 2 is a block diagram illustrating a system including hardware components and software components for manufacturing a cable harness according to some embodiments.

The assembly board of the arrangement of FIG. 1 is a digital assembly board 110 having an upper surface 120 for receiving tooling components 200. The digital assembly board 110 includes a display 130. The display is configured to display content 135 relevant to the cable harness assembly operation. The displayed content 135 may for example indicate the form of and location of components 500, 510 of the cable harness assembly to the user 125. The displayed content may further provide an indication of the required location of the various fixtures and required components 510.

The upper surface 120 includes an at least partially transparent surface. The upper surface 120 is arranged over a display 130 and is configured to allow the user 125 to view the displayed content 135. The upper surface is configured for receiving the routing elements by suction force connection. Preferably the upper surface 120 includes glass, for example tempered glass.

The digital assembly board 110 is connectable, by wired or wireless means, to a computer 115 having a processor 116 and a memory 117. Software 300 is executable to control operation of the digital assembly board 110. The software 300 includes instructions executable to provide for control of the digital assembly board as required including to display content 135.

In use, the surface 120 of the assembly board 110 may be arranged horizontally, in the manner of a traditional assembly board table. Alternatively, the board may be arranged at an angle between horizonal and vertical. As an example, the assembly board may be arranged at an angle of between 50 and 90 degrees, most preferably at an angle of between 60 and 80 degrees.

The tooling components of arrangements of the present specification are described further with reference to FIGS. 1 and 3 to 7. It will be appreciated that the multiple tooling components are used in combination, in the manufacture of a cable harness. In brief overview an manufacturing arrangement, is described with reference to FIG. 1, it is noted that routing elements 220, 1220, 2220 are provided to attach a support or receiver to the assembly board. When the routing element is attached to the assembly board, the support 223 arranged substantially in a plane parallel to the assembly board, is configured to receive one or more cable routing fixtures such as cable holders or cable forks. Cable routing fixtures may for example include a cable fork which when located at the support is positioned at a selected location on the surface of the assembly board (for example at coordinates x1, y1 and extending in a direction substantially perpendicular to the assembly board to locate the fork at a distance z1 relative to the assembly board to support a cable harness at a separation (D2) from the assembly board.

Referring to FIGS. 3A to 3E, a cable routing element 220 is described. The cable routing element 220 which is attachable to the assembly board is configured for positioning cable routing fixtures/holders on the assembly board for wire harness manufacturing. Cable routing element 220 includes a vacuum holder 221 (suction holder). The suction holder 221 of the arrangement of FIG. 3 includes three suction cups 240. The routing element 220 includes a support 223, having an upper support surface 224. The support 223 includes one or more apertures 227 or receivers. Apertures 227 are configured for receiving tooling components such as cable routing fixtures, cable holders 210, cable forks 211.

The support 223 is connected to upper surfaces 241 of the suction cups 240 and couples the suction cups 240 to each other. The suction cups 240 are arranged axially around a central vertical axis (z-direction, through center 222) of the routing element 220 and the support 223. The support 223 may be integrally formed with the suction cups as a single integrated element, and as described below, the actuators (not shown) for operation of the suction cups may be located on the support.

The provision of three suction cups 240 provides a greater suction force between the routing element 220 and the assembly board 110 and improved stability of attachment between the routing element 220 and the assembly board 110.

The routing element 220 includes a lower attachment portion 248 having a lower assembly board facing surface 243 and an upper support portion 223' including the upper fixture support which in use is cable facing. The lower attachment portion 248 and upper fixture support are concentrically arranged. The lower attachment portion 248 in the arrangement of FIG. 3 extends over a greater area at the assembly board than the area of the upper support portion 223'. The footprint of the lower attachment portion 248 of the routing element at the assembly board is defined by the peripheral walls thereof, and includes the area defined by outer peripheral walls 244 of the suction cups. The lower attachment portion 248 is also configured to generally extend outwardly relative to peripheral surface 225 of the upper fixture support. This combination of features and the arrangement and location of the support portion centrally relative to the attachment portion 248 of the routing element 220 provides improved stability at the support 223, and as a result stability at the connected cable fixture elements or tooling components and the loads carried thereon, all supported by the routing element.

A portion of the support 223 is located between the suction cups 240. As shown in the arrangement of FIG. 3 the apertures 227 of the support are located within a radius R1 relative to the center 222 which substantially corresponds to the distance from the center 222 of the routing element 220 to the center of each of the suction cups. The distance R1 is less than the distance from the center 222 to the outermost portions of the suction cups indicated generally as distance R2. Again, the arrangement of the routing element with at least portions of the suction holder 221 axially external to the support 223 provides a secure and stable support for cable fixing elements located in the one or more apertures 227.

The suction cups 240 include a housing 245 having an upper surface 241 and a peripheral side wall 244 of a generally cylindrical form, the side wall 244 extends between the upper surface 241 of the suction cup and a lower edge surface 243. An opening 242 is defined by lower edge surface 243. The suction cups 240 have a generally circular or ring form in cross-section. The suction element is housed within the housing 245 and movable therein to activate or deactivate the suction to attach to or detach from the surface of the assembly board. The suction element is activated or deactivated by means of an actuator or lever (not shown) that affects the movement of the suction element. The actuator or lever is located at the support 223 of the routing element. The actuator may be configured to operate the suction element by turning clockwise and anti-clockwise or alternatively may include a lever. The suction element may include a rubber element or other suitable arrangement for providing the required suction force.

It will be appreciated that a suitable alternative actuation arrangement may be used to activate and deactivate the suction cup(s). For example, the suction cup may be actuated using a vacuum system.

The side walls 244 of the suction cups 240 by virtue of the features and form thereof, extend in use in a direction substantially perpendicular to the plane of the assembly board 110. The arrangement and the cylindrical form of the side walls 244 also provides an improved stability at the suction holder and support for the suction element. The arrangement of the housing 245 reduces effects of tilting or movement of the suction cup in comparison with suction cups that have a tapered or sloping side wall. The suction element is effectively supported within the housing 245. Further the suction cups 240 have a low profile D1 and are compactly arranged.

The suction force, described by the vectors of suction force strength, applied by the triple suction cup is substantially in linear proportion to that from a single cup 240 according to the arrangements of the specification. A single suction cup 240 is configured to support a load of the order of 147 Newtons (15 kg) in the direction of the orthogonal axis (Z-direction in the drawings) and to support a load of the order of 49 Newtons (5 kg) when arranged vertically and the force direction is vertical. Accordingly, a triple suction cup holder 221, arranged is configured to support a load of the order of 441 Newtons (45 kg) in the direction of the orthogonal axis (Z-direction) and arranged vertically is configured to support of the order of 147 Newtons (15 kg), when the force direction is in a vertical direction. Noting that the assembly board 110 may be arranged at an angle, the routing elements 220 (and 1220, 2220) of the present specification are configured to support loads of substantially 5 to 15 kg vertically (substantially 15 to 45 kg in the direction of the orthogonal axis).

In the arrangement of FIG. 3 the side walls 244 of the adjacent cups 240 are not directly coupled to each other and the suction cups are relatively spaced apart and connected by the support 223. The support 223 may include a lower support body portion 249 (similar to lower support wall 1249 shown in the arrangement of FIG. 4 between the side walls 244 of adjacent suction cups 240). The spaced apart arrangement of the suction cups further contributes to the footprint of the lower attachment portion 248 being larger than that of the support 223 for improved stability and an increased support surface area between the suction cups.

It will be appreciated that the spacing or separation between the suction cups may be greater than shown in the arrangement of FIG. 3. Similarly, the area of the support portion extending between the suction cups may be greater and provide a larger support surface area or additional apertures.

It will be appreciated that while the routing element 220 includes three suction cups, the advantages of the arrangement apply to routing elements having multiple suction cups and a routing element having a greater number of suction cups may be provided.

The routing element 220 further includes locator features configured for inter-connection with corresponding features of other components of the system 100 for manufacture of a cable harness, such components include for example, a support plate 600 as described further below, or for co-location with other routing elements according to arrangements of the specification.

The routing element 220 includes protrusions 231 configured to be received in an aperture 627 on an underside of a support plate 600. The protrusion 231 has a form configured to correspond to that of apertures 627 of the support plate.

The routing element 220 further includes protrusions 235 located in the support 223 above each of the suction cups 240 and including a central shaft 236 and peripheral wall 237. Levers or actuators for activating or deactivating the vacuum are located at protrusions 235 and connected to the suction element via shaft 236. Movement of the lever or actuator at the support 223 of the routing element 220 affects the movement of the suction element of the suction cup 240, as required. The protrusions 235 and shafts 236 are located at the central Z axes of the respective suction cups 240. The suctions cups 240 of routing elements 1220 and 2220 are similar to suction cup 240 described above.

The protrusions 235 have a generally cylindrical form and the peripheral walls 237 thereof may define locators which may be arranged in use in contact with another element such as a support plate 600 to engage with and prevent movement of the support plate. The support plate may be arranged between protrusions 235.

Figure 3A:
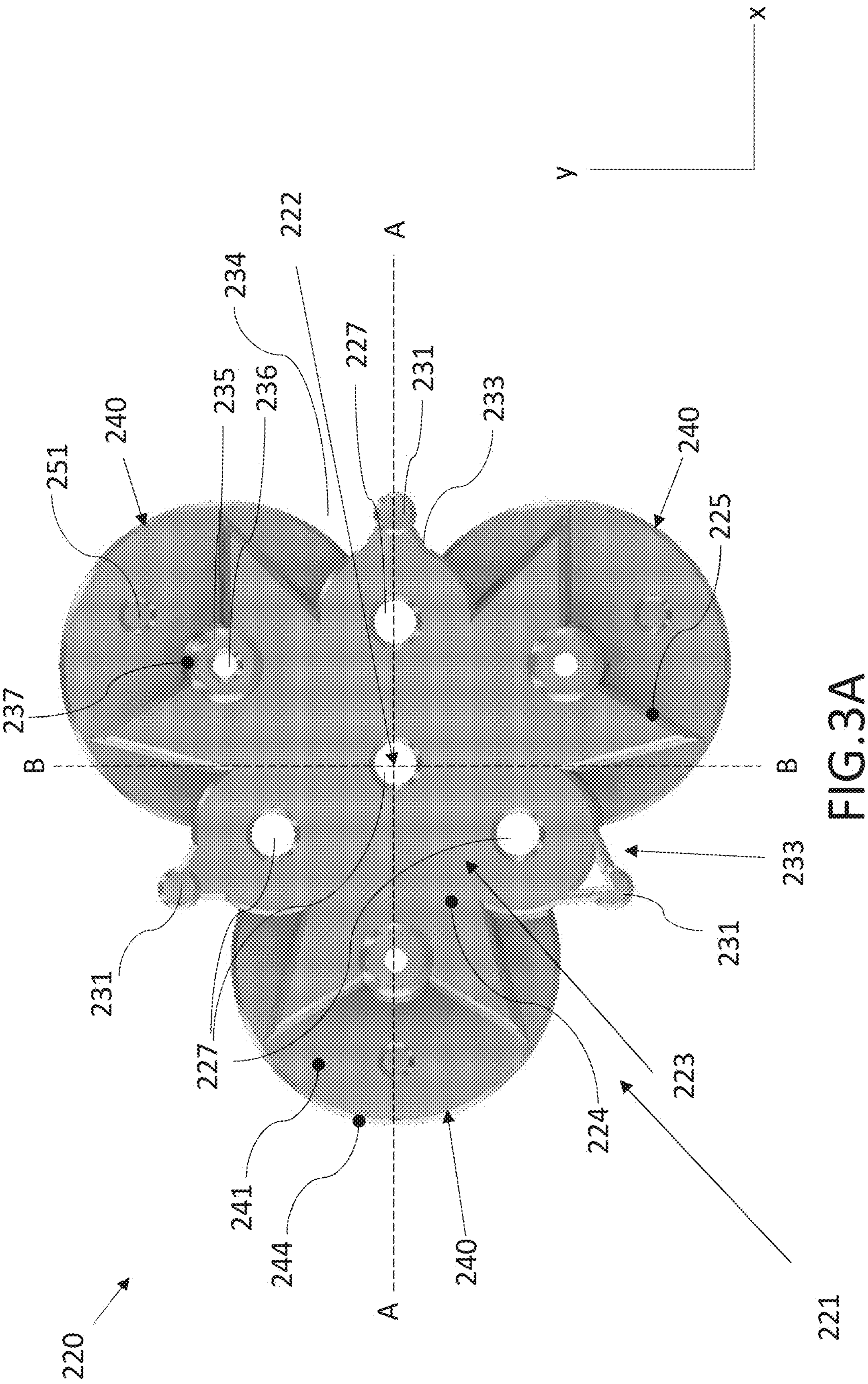
FIGS. 3A and 3B show top perspective views of a routing element according to arrangements of the present specification, in particular the routing element includes a vacuum holder having three suction cups according to some embodiments.
Figure 3B:
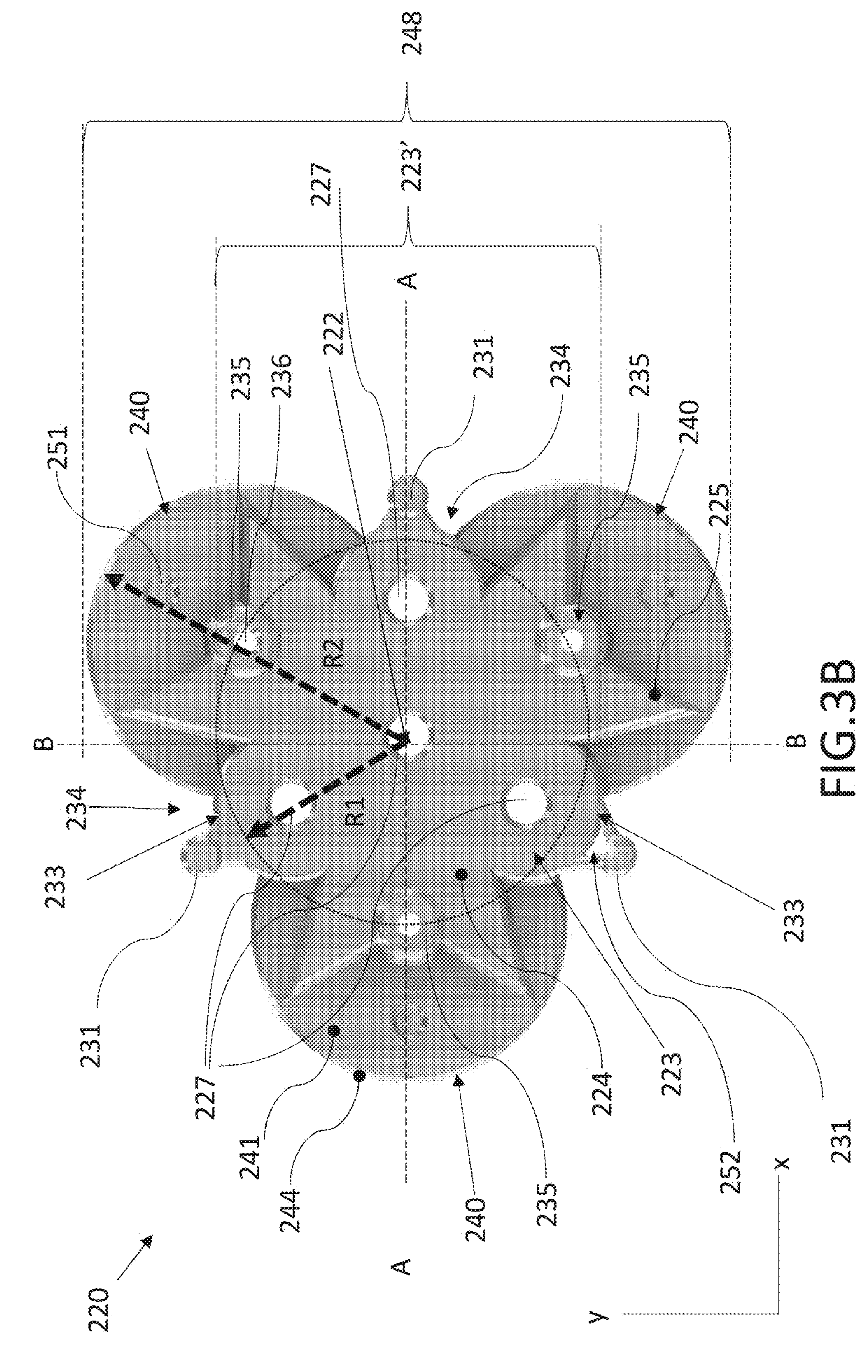
Figure 3C:
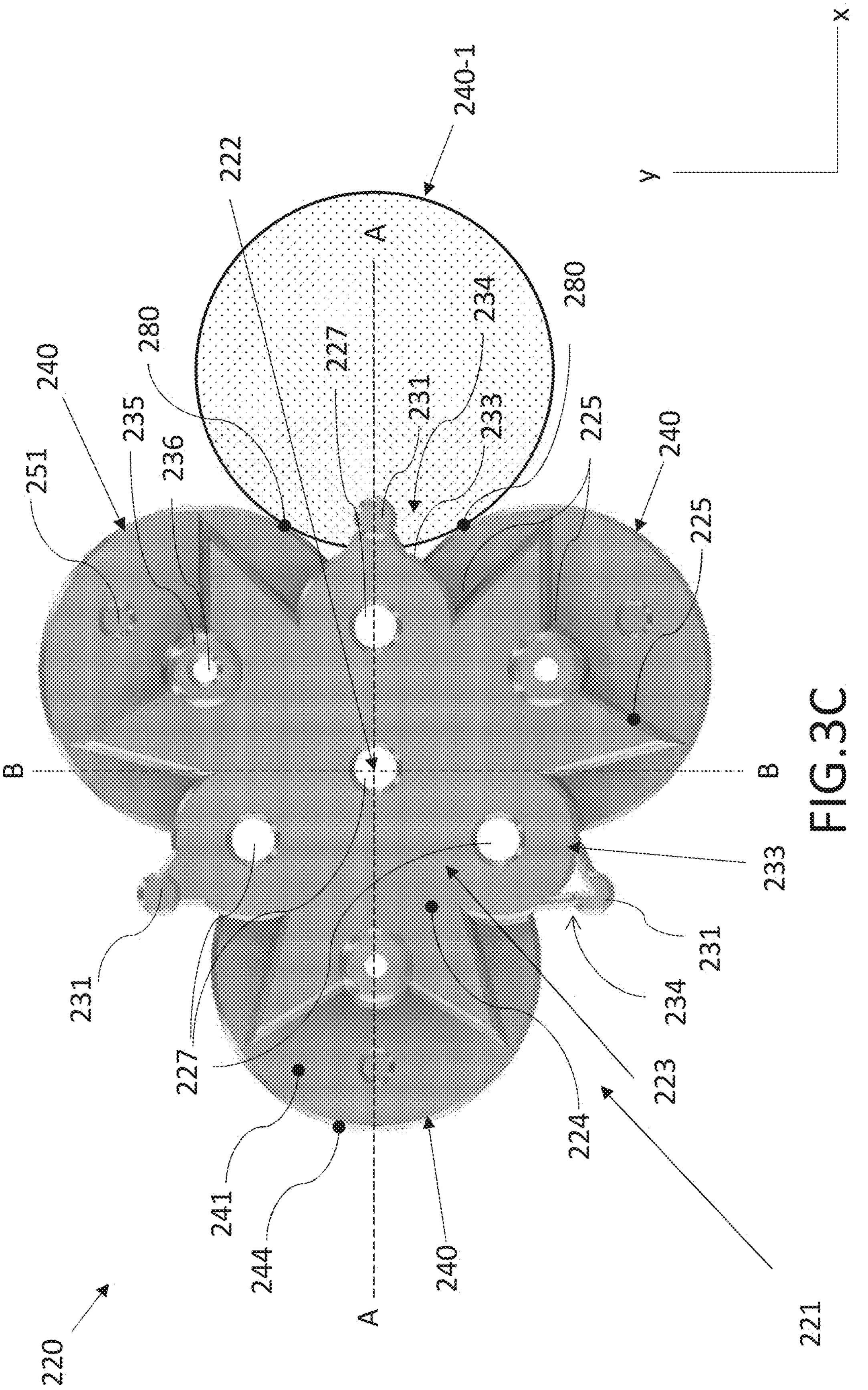
FIG. 3C provides a top perspective view of a routing element showing in outline coupled with a suction cup of another other routing element according to some embodiments.

The routing element 220 may further include one or more recesses 234 configured for receiving a portion of a suction cup 240-1 of another routing element as illustrated in FIG. 3C. Recess 234 is defined by portions of the side walls of two adjacent suction cups, and a recess retainer wall 233. In the arrangement of FIGS. 3B, 3C, the recess retainer wall 233 is defined by a portion of the support 223. Retainer wall 233 extends over the recess 234. The recess 234 and retainer wall 233 provide a receiver configured to accommodate and locate a suction cup. The suction cup 240-1 when located in receiver 234 contacts the side walls 244 at contact area 280 and may also abut retainer wall 233. This configuration is advantageous for use in applications when an increased supporting surface area at the assembly board 110 is required. The recesses 234 of the routing element allow for a co-location of one or more routing elements.

In the arrangement, the routing element 220 further includes guide features 251 and guider apertures 252 defining an orientation guide. The guide is provided to allow identification of and control of the orientation of the routing element 220 relative to the assembly board and/or relative to other components. Guide features 251 are arranged to allow improved accuracy in positioning of the routing element and for alignment with other tooling components, as required. Guide feature 251 of the arrangement of FIG. 3 includes a recess formed in the upper surface of suction cup 240. Guide feature 251 includes a guide aperture 232 formed in the upper support surface 224. Guide aperture 252 is provided in the retainer wall 233. The assembly board 110 can be seen through the guide aperture 252. The guide aperture 252 by its configuration has high visibility for users and/or ease of detection using machine vision.

Referring to FIG. 3, the support 223 may include further guide features including shaped portions formed in the peripheral edge surface 225 of the support 223. The edge surface 225 of the arrangement includes points, recesses, rounded edge features, and rounded points each uniquely identifiable. The guide features may also include a coated area or feature of the support or markers. Coatings or markers may be provided to support visibility. The coating or markers may for example include a high contrast or fluorescent coating for use with a machine vision system.

Figure 3D:
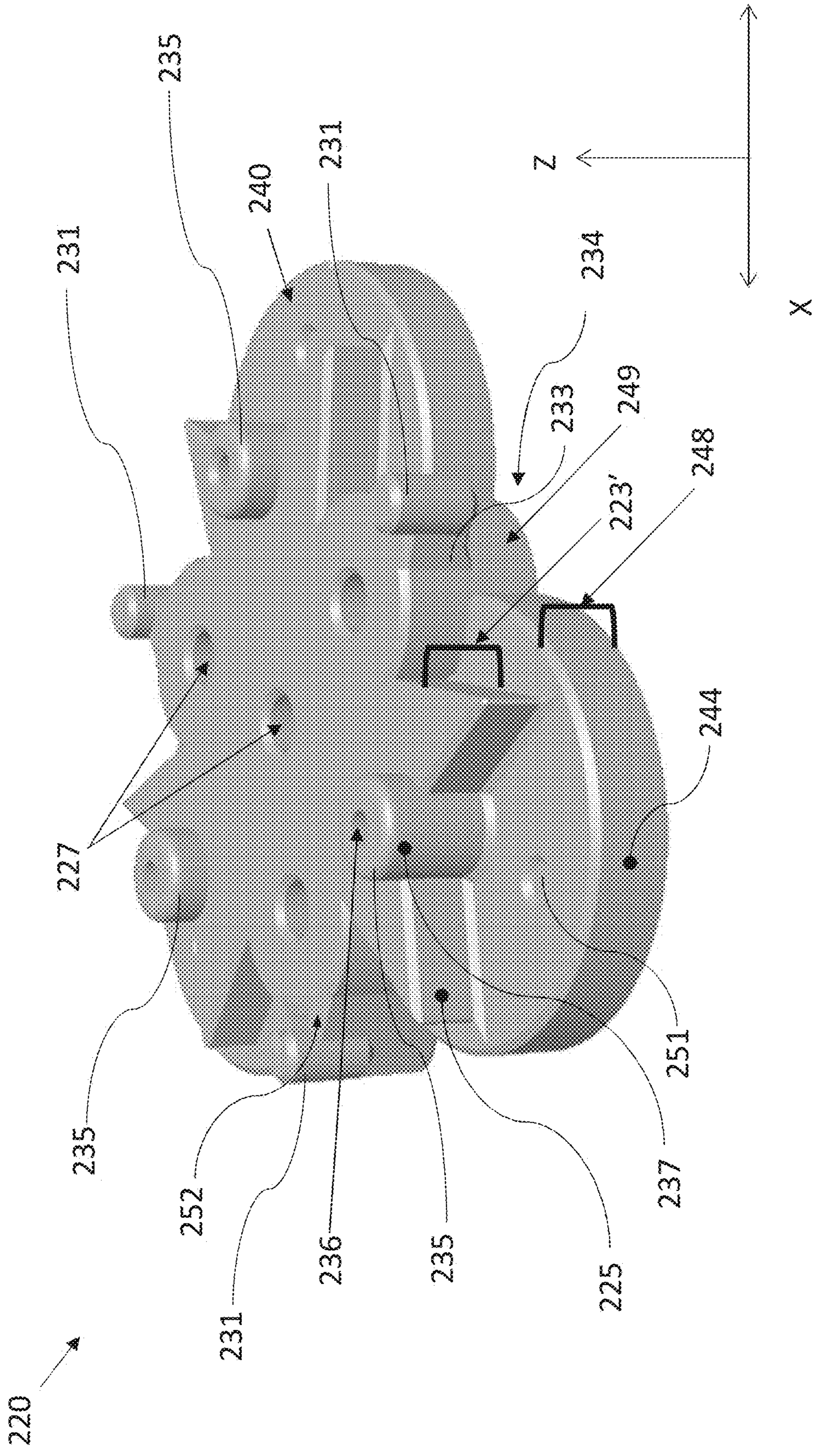
FIG. 3D shows a top-side perspective view of the arrangement of FIGS. 3A to 3C according to some embodiments.

FIG. 3D illustrates a perspective view of the routing element 220 of FIGS. 3A-3C. The perspective view shows in further detail the relative positions of the peripheral surface 225 of the support 223 and the outwardly extending the lower attachment portion 248. In this arrangement, the retainer wall 233 of the support 223 extends over the recess 234.

Figure 3E:
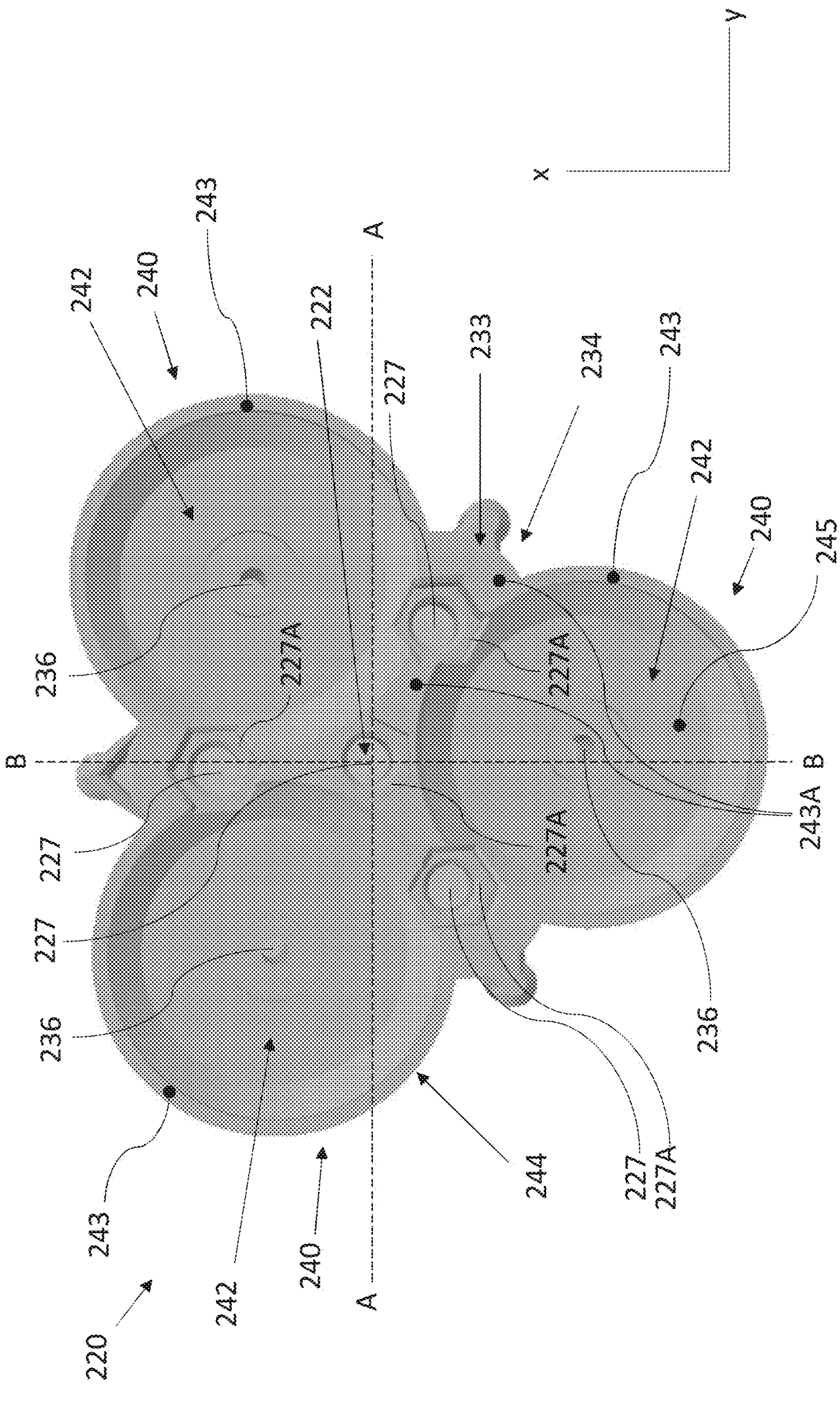
FIG. 3E shows a bottom-side view of the routing element of FIGS. 3A to 3D according to some embodiments.

Referring to FIG. 3E, the underside of the routing element 220 of FIGS. 3A-3C is shown. The drawing illustrates the suction cups 240 arranged axially around the central vertical axis (z-direction, through center 222) of the routing element 220 in further detail. As described, the support 223 may be integrally formed with the suction cups 240 as a single integrated element. In this arrangement, a lower surface 243A of the support and the lower surfaces 243 defined by the edges of the suction cups are integrally formed to provide the contacting surfaces 243, 243A in the assembly board facing direction.

As previously discussed, the side wall 244 extends between the upper surfaces 241 and a lower edge surface 243 of the suction cups 240. The suction cups 240 have a generally circular or ring form in cross-section. An opening 242 is defined by lower edge surface 243. The suction element (not shown) is housed within the housing 245 and movable therein to activate or deactivate the suction to attach to or detach from the surface of the assembly board. A recess 227A may be provided on the lower surface at the location of apertures 227 for securing the cable, such as cable holders 210 or cable forks to the routing element.

It will be appreciated that the form of the support 223 may be varied as required, to include different or suitable alternative guide features. It will be appreciated that guide features may alternatively or additionally be formed integrally with the one or more suction cups 240.

Figure 4A:
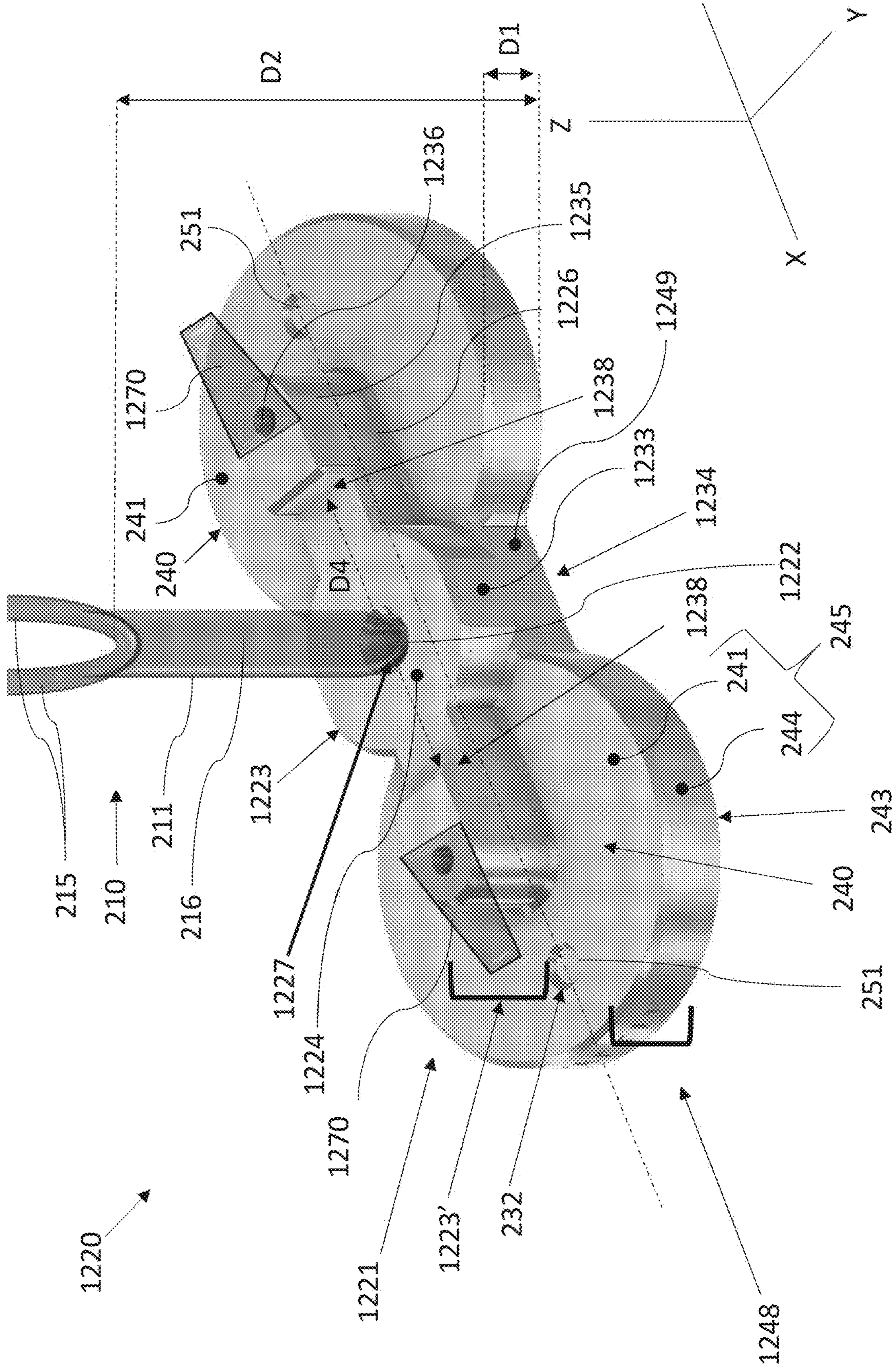
FIG. 4A provides a top-side perspective view of a double suction cup vacuum holder routing element according to some embodiments.

Referring to FIG. 4A a routing element 1220 according to a further arrangement of the specification is described. Routing element 1220 includes a double suction cup vacuum holder 1221. Features of the routing element 1220 are similar to those of the routing element 220 of FIG. 3 and the same reference numbers have been used where appropriate. The vacuum holder 1221 has two suction cups 240 arranged about a support 1223. The suction cups 240 have a generally circular form in cross-section and are arranged axially spaced apart relative to a central vertical axis (Z direction located at the center 1222) of the vacuum holder 1221. The suction cups are located arranged longitudinally spaced apart, in the X direction defining the longitudinal axis of routing element 1220, either side of the support 1223. The routing element 1220 has a greater extent in the longitudinal (X) aspect than the lateral (Y) aspect.

The routing element includes a lower attachment portion 1248 having a lower assembly board facing surface and an upper support portion 1223' which, in use, is cable facing. The lower attachment portion 1248 and upper support portion 1223' are concentrically arranged. The support 1223 includes an upper fixture support surface 1224 formed between the suction cups and extending over a portion of upper surfaces 241 of the suction cups 240. The support 1223 includes an outer peripheral wall 1226. The support includes one or more receivers or apertures 1227 which are configured for receiving cable fixing such as cable holders 210 or cable forks. Aperture 1227 is located at the central vertical axis (Z-direction extending through center 1222) of the routing element 1220.

It will be appreciated that in an alternative arrangement the support may include a plurality of apertures or that the form of the support 1223 may be varied for example to provide an increased area or an increased number of apertures 1227.

Suction cups of FIG. 4A are similar to those of FIG. 3. The suction cups 240 have a housing 245 having side walls 244 a depth of the housing is indicated in FIG. 4 as D1, the suction cups 240 are compact and have a low profile. Suction elements are housed in the housing 245 and moveable therein. As described, the suction holder is advantageously arranged to provide stability at the support 1223 and for the cable harness supported thereon. The side walls 244 in use are arranged to extend in a direction perpendicular to the plane of the assembly board 110. The arrangement and the cylindrical form of the side wall 244 provides an improved stability and decreases effects of tilting or movement in comparison with for example a suction cup having a tapered side wall. Referring to the drawings, in the orthogonal axis ("Z" axis direction) the arrangement can support a load of the order of 294 Newtons (30 Kg), in the X axis direction the load supported is of the order of 98 Newtons (10 Kg) and in "Y" axis direction the load that may be supported is of the order of 68.9 Newtons (7 Kg).

The routing element includes a recess 1234 defined by portions of the suction cups, lower support wall 1249 and retainer wall 1233. The retainer wall 1233 is defined by a portion of the support 1223 that extends over the recess 1234. The recess 1234 is configured to receive a portion of a suction cup of another routing element and allows for a near co-location of the suction cup of an adjacent routing element in the recess.

The routing element 1220 further includes first and second retainer walls 1238 spaced apart, by distance D4, at the support 1223. In use, a support plate 600 (such as described with reference to FIGS. 6 and 7 below) may be arranged extending across the support surface 1224 of the routing element between the retainer walls 1238 which act to prevent movement of the support plate. A fixing element may be inserted through an aperture of the support plate and apertures 1227 of the routing element to fix the support plate thereto.

Referring to FIG. 4A cable fork 211 (or other cable holder element) is receivable in the aperture 1227. When cable fork 211 is in position on the routing element 1220 the arrangement is configured such that one or more cables received in the cable fork are located at a distance D2 relative to the surface of the assembly board. The cable fork 211 has a Y or U shaped configuration having two upper prongs 215, arranged for receiving a cable harness and a shaft portion 216 configured to be received within the apertures 1227.

Routing element 1220 further includes a guide including guide features 251. In the arrangement of FIG. 4, the guide features include recesses located on upper surfaces 241 of the suction cups 240. As described with reference to FIG. 3 above, the form of guide features 251 of the routing element may be varied as required and may include physical guide features formed in the routing element and/or markers. In the arrangement of FIG. 4 first and second guide features 251 are arranged at points on the longitudinal axis of the routing element 1220.

The overall area or footprint of the upper support portion 1223' of the routing element defined by the support 1223 is less than the footprint or area covered by the lower attachment portion 1248 thereof. The support 1223 and apertures 1227 are located centrally relative to the two suction cups 240. Overall, the relatively greater area covered by the suction cups and lower attachment portion 1248 at the assembly board facing side provides excellent stability at the support 1223. Similarly, it will be appreciated that the central location of the support 1223 and the apertures or apertures 1227 allow for an improved stability of the arrangement for supporting loads such as a cable harness.

The arrangement of FIG. 4A includes protrusions 1235 and shafts 1236 formed in the support 1223. A lever or actuator 1270 is provided at the protrusion 1235 to allow operation of the suction element with access via shaft 1236. The lever or actuator is movable to affect the activation or de-activation of the suction element.

Figure 4B:
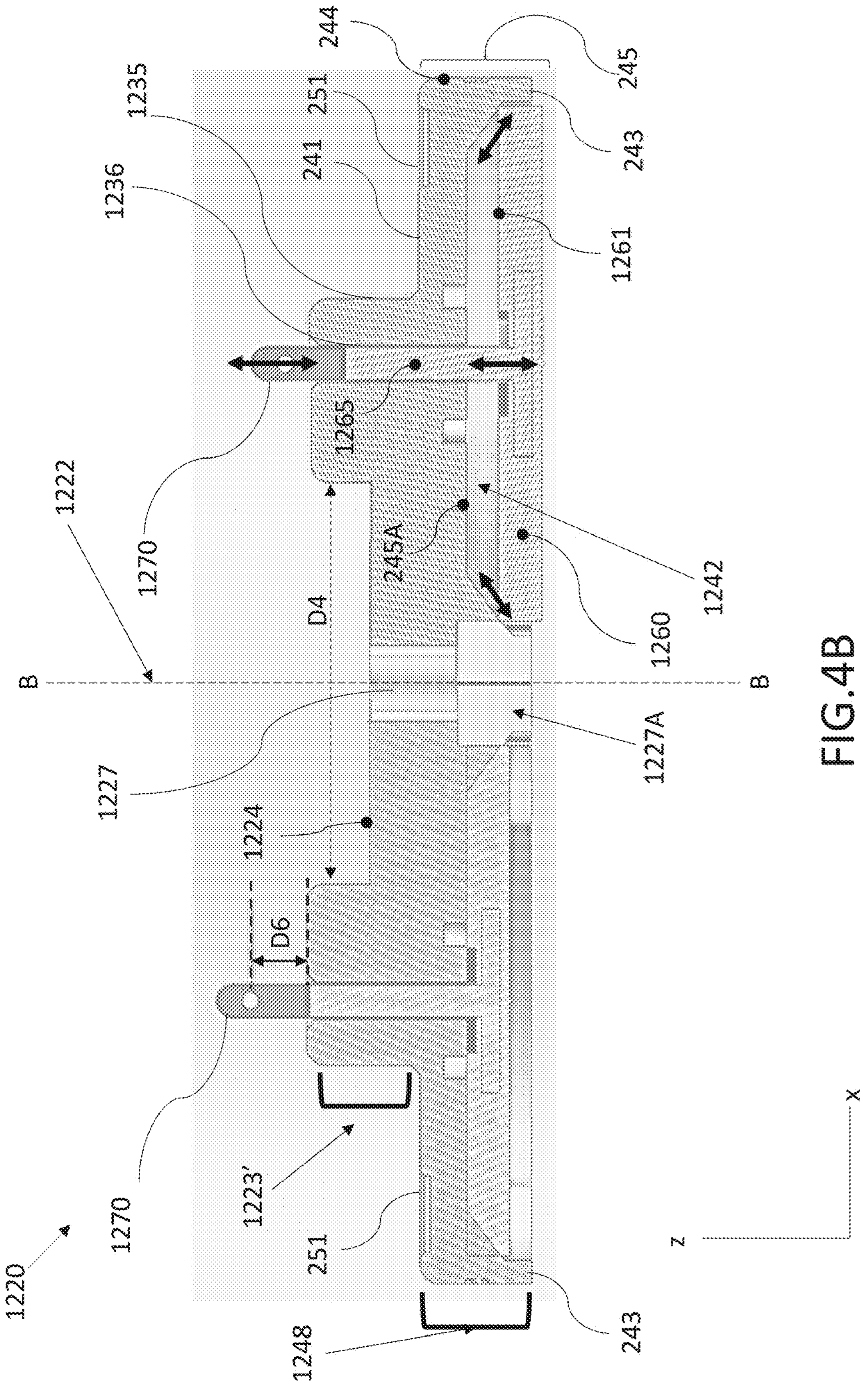
FIG. 4B shows a cross-sectional side view of the double suction cup vacuum holder routing element of FIG. 4A, in which one of the suction cups in a de-activated configuration and the other in an activated configuration according to some embodiments.

Referring to FIG. 4B, a side cross-sectional view of routing element 1220 is described. The routing element 1220 includes a double suction cup vacuum holder 1221. The suction cups are arranged axially around a central vertical axis B-B (Z-direction, through center 1222) of the routing element 1220.

The housing 245 and the peripheral side wall 244 of the suction cup 240 are of a generally cylindrical form as illustrated in FIG. 4A. As described above, the side wall 244 extends between the upper surface 241 of the suction cup and a lower edge surface 243. The suction cup 240 has a generally circular or ring form in cross-section. An opening 1242 is defined by lower edge surface 243. The suction element 1260 is housed within the housing 245 and movable, in the direction of the arrows, therein to activate or deactivate the suction for attaching to or detaching from the surface of an assembly board 110.

The routing element 1220 includes protrusion 1235 and shaft 1236 for connection of a lever or actuator 1270 to a suction element located in the housing 245. The suction element 1260 is activated or deactivated by means of lever or actuator 1270 movable to provide a movement of the suction element via the apertures 1227. The lever or actuator 1270 may be attached to a central pin 1265 having a generally T-shape configuration with an elongated vertical section located within the apertures 1227, the elongated vertical section being attached to an elongated horizontal section, extending in the X direction. The elongated horizontal section may be embedded in the suction element 1260 for effecting movement of the suction element when the lever or actuator 1270, to which the pin 1265 is attached, is activated or deactivated.

A suction cup in a de-activated state is illustrated in the right most suction cup of FIG. 4B and a suction cup in an activated state is illustrated in the left most suction cup of FIG. 4B.

Referring to FIG. 4B, the lever or actuator 1270 is moved such that the central pin 1265 is moved upwardly in the Z direction by a distance, D6, so as to activate the suction of the suction cup in use. In this arrangement, the suction element 1260 is moved upwards in the Z direction such that an upper surface 1261 of the suction element 1260 is coupled to the inside surface 245A of the housing 245. Movement of the suction element 1260 within the opening 1242 of the housing 245 creates a suction when the suction cup is placed on a surface of an assembly board 110 thereby attaching the routing element to the assembly board 110.

In some arrangements recess 1227A may be provided in the lower surface of the support for receiving a securing means, for example a nut, for securing the cable fixing such as cable holders 210 or cable forks to the routing element 1220 via apertures 1227.

Figure 5:
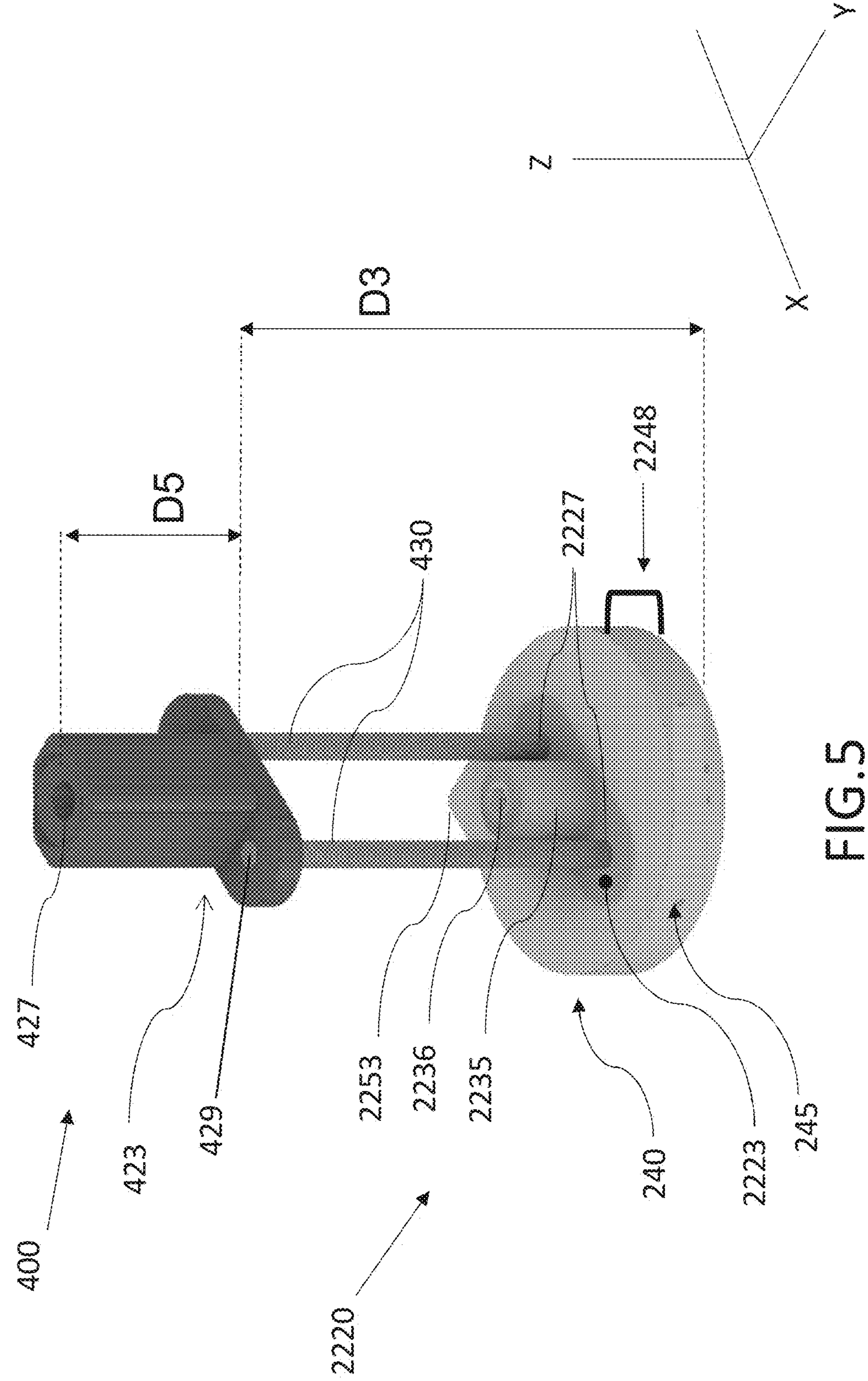
FIG. 5 provides a perspective view from the side of a single suction cup vacuum holder routing element according to some embodiments.
Figures 6A, 6B, 6C:
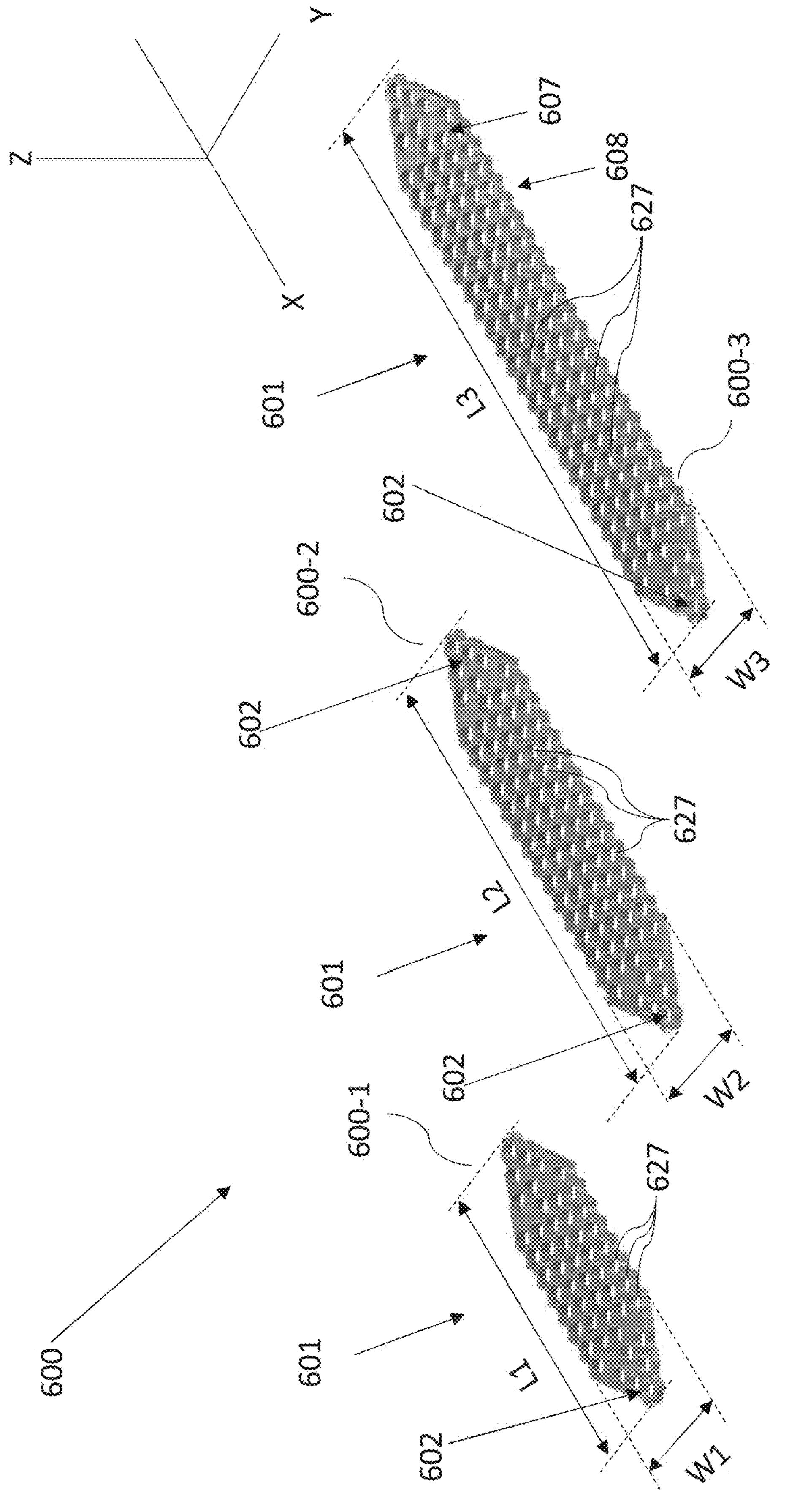

FIG. 5 provides a perspective view from the side of a single suction cup routing element 2220 according to arrangements of the present specification. The routing element 2220 includes a suction cup 240. The routing element 2220 includes a support 2223 having a plurality of apertures 2227. The suction cup 240 further includes an orientation guide 2253. Suction cup 240 is similar to suction cups 240 described with reference to FIGS. 3 and 4.

Referring to FIG. 5 a spacer element 400 is described. The spacer element 400 includes an upper support 423, a receiver 427, and support legs 430. The spacer element 400 is adjustable to allow a change of the position of the support 423 and receiver 427 relative to the routing element and assembly board 110. The spacer element 400 allows for adjustment of the clearance height or distance between the board and the cable harness. The spacer element 400 is configured in a preferred arrangement to support a body clip. The adjustable spacer element 400 facilitates user access from all sides to the components of the cable harness under manufacture. This provides improved access for performing operations such as taping/covering of the harness elements and for accessing the cables or wires.

The support legs 430 may be removably receivable, as shown, in apertures 2227 of the routing element 2220. The spacer element 400 locates the receiver 427 at a distance D3 from the surface of the assembly board. The form of the spacer element 400 including the receiver 427 centrally located between two support legs 430 provides stability and balancing of the loads and forces. A body clip receivable in receiver 427 is securely held and firmly positioned therein—providing a stable support for the cable harness. The receiver 427 has a depth D5 to provide a stable connection between the body clip and the receiver. The support 423 includes receivers 429 for receiving support legs 430. The length of the spacer element 400 (from the support 423 to lower end of the support legs 430) may be adjustable by adjusting the position of the support legs in receivers 429 and the position of the receiver 427 relative to the assembly board.

The support legs 430 and apertures 1227 may include corresponding connection features. The support legs 430 may extend through support 2223 to the interior of the housing 245 and may be connected at the interior side to the housing. The spacer element 400 may be integrally formed with the suction cup and the routing element, and in such arrangement configured for adjustment at the upper end of the support legs 430 at the upper support 423.

Similarly, to the routing elements of FIGS. 3 and 4, the routing element 2220 includes a protrusion 2235 and shaft 2236 for connection to the suction element located in the housing 245. A lever or actuator may be provided at the protrusion 2235 and configured such that movement thereof controls activation and deactivation of the suction element.

The suction cup 240 is similar to those of FIGS. 3 and 4. The suction cup includes a housing 245 housing the suction element. The suction cup 240 is configured to provide a high level of stability for the support. The description of the suction cup above applies also to the arrangement of FIG. 5.

The spacer element 400 including an adjustable support 423 may be formed integrally with the routing element. The routing element 2220 of such an integrated arrangement accordingly provides, similarly to the other routing elements 220 and 1220 described above, an upper support 423 having a receiver 427 located at the central vertical axis of the routing element 2220 and a lower attachment portion 2248 including a suction cup 240 arranged axially around the central vertical axis of the routing device and having a radial extent greater than that of the support. The routing element 2220 is accordingly arranged to provide a high stability at the support by virtue of the relative arrangement of the upper and lower portions. The vertical position of the support 423 being adjustable. The routing element 2220 is configured for use or co-location with routing elements 1220 or 220 and is dimensioned to be receivable in recesses 1234 or 234.

FIGS. 6*a*, 6*b* and 6*c* and FIG. 7 provide perspective views of fixture support plates 600 according to arrangements of the present specification, the support plates 600 are configured to provide an increased surface area for receiving cable fixture elements such as cables holders, cable forks, or spacer elements 400. The support plates 600 have an upper surface 607 and a lower surface 608 and include a plurality of apertures 627 arranged between the upper and lower surfaces.

The fixture support plates 600 define a support configured in use for location in a plane parallel to that defined by the surface of the assembly board 110. The support plates 600 provide an extended support surface area relative to that provided as formed on routing elements 220, 1220, 2220. The support plates 600 according to the arrangement of the specification advantageously provide an increased number of apertures 627 for receiving cable holders also at locations between routing elements and are useful in applications that have a requirement for a higher density of cable holders.

Figure 7:
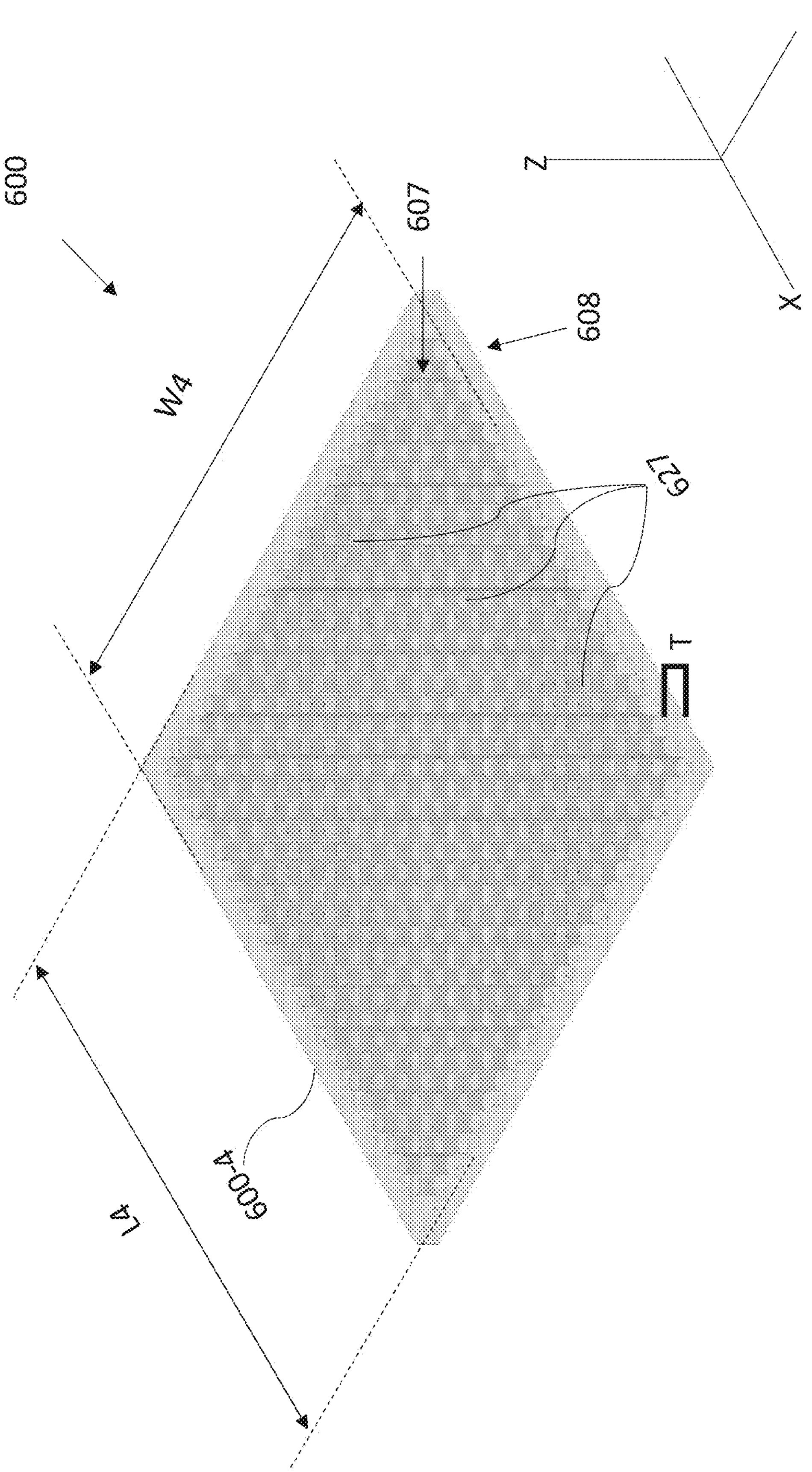
FIG. 7 provides a perspective view of an alternative fixture support plate having a generally square form according to some embodiments.

Referring to FIGS. 6 and 7 fixture support plates 600-1, 600-2, 600-3 and 600-4 are shown. Each of the fixture support plates 600-1, 600-2, 600-3 of FIG. 6 has an elongated form. The support plate 600-4 has a generally square form and is perforated including a plurality of apertures 627 for receiving one or more fixing elements.

The support plates 600 of FIG. 6 may for example be of length of between 240 mm and 50 mm and width of between 70 m and 20 mm. The first and second ends of support plates 600-1, 600-2 and 600-3 may be formed to taper from a maximum width at the main body portion 601 of the plates to define tapered ends 602. The tapered ends are provided for connection of the support plate 600 at an aperture 227 of a routing element and a pin or fixing element may be inserted into the aperture 227 of the support via an aperture 627 of the support plate. As described above a routing element may include a protrusion 231 (FIG. 3) receivable in an aperture 627 of the support plate to align the support plate to the routing element at a second point. A support plate may be arranged between two or more routing elements 220, 1220, 2220 in use.

Referring to the arrangement of FIG. 4, a support plate 600 may be arranged between the locator walls 1238. The support plate may also be fixed to the support at apertures 1227.

The support plates 600 may be formed of a metal material, for example Aluminum. Alternatively, support plate 600 may be formed of a polymer material, such as a polycarbonate material. In preferred arrangements the support plate may be formed of a translucent polycarbonate material. In an arrangement the polymer material may be formed of MARGARD™. However, it will be appreciated that other suitable materials may be used. Where the support plates are translucent or at least partially transparent, such arrangement allows a user 125 to have visibility of the surface 120 of the assembly board 110 and to see displayed content 135 through the support plates.

The support plates 600 are configured to enable the user 125 to affix more cable holders or cable forks in a concentrated area. The support plates 600 thereby extend the spatial area available for assembling the cable harness and effectively address spatial constraints that may be encountered in the manufacture of a high density harness. The support plates by their configuration enable the user 125 to affix more forks in a concentrated area.

The support plates include a plurality of apertures 627 which is similar to apertures 227, 1227, 2227 and receiver 427 are configured to receive one or more cable fixing elements and may also be configured to receive spacer elements 400, as described above. Support plates 600 are supported at a separation from the assembly board. The separation corresponds to the height of the routing element(s) at which it is located. In some arrangements, the cable fixing element may be supported extending through the aperture to the assembly board. When a cable fixing element is received in an aperture 627, the inner surface of the aperture overlaps a portion of the support leg of the cable fixing element to retain it. The retention may be by friction fit, in addition or alternatively a fixing, for example a nut may be applied at the aperture to secure a cable fixing element therein. The support plate is configured by selection of the material, depth and form of the support plate to have strength sufficient to stably support tooling components and the cable harness. The depth T of a support plate 600 may be varied and is selected to provide sufficient overlap between the receiver and cable fixing element for secure attachment. If it is desired to provide a support plate that is translucent or transparent, the depth T may also depend on properties of the material and may be limited to depths that allow the required visibility of the assembly board through the support plate.

According to arrangements of the specification, portions of the routing elements 220, 1220 and 2220 may also be formed of a transparent or translucent material to provide improved visibility of the assembly board.

The specification provides improved routing elements 220, 1220, 2220 having a plurality of suction cups 240 located about the routing element support a combination of features which advantageously provides for an improvement in the stability of attachment between the routing elements and the assembly board and results in improved stability at the support and receiver centrally located relative to the suction cups. The suction cups are compact and provide a strong suction force for attachment of the routing element at the assembly board. Routing elements may further include guide features to allow for improved identification and control of the orientation of the routing element relative to other components and for accuracy in alignment of the routing element with other components. The support plates according to the specification define perforated ‘fixture helper’ devices that advantageously allow for affixing a greater number of forks/fixtures in a concentrated area. The support plates are configured for connection to one or more routing elements including for example to extend between two or more routing elements and the arrangement of the routing elements and support plates allow for ease of access to an increased spatial area at the assembly board than would be possible with use of conventional routing elements only.

The specification also provides a cable harness manufacturing system including an assembly board, having an attachment surface configured for receiving tooling components to support and locate the cables during manufacture and tooling components for use with the assembly board. Also provided is a kit of tooling components for use in a cable harness manufacturing system. The kit includes one or more routing elements of the different types described and one or more support plates. The routing elements of the kit are of common height and form. The support plates are dimensioned and formed for connection to and between the routing elements. For example, a support plate may have width corresponding to that of the distance between locators on the routing element. The support plates include apertures for connection to a receiver of a routing element and for receiving a corresponding protruding locator. The support plates provide for support of cable holders and cable fixing tools in an area between routing elements. The kit allows use of a workspace at the assembly board that has an increased useable volume in comparison with prior art arrangements. The routing elements described have improved stability and suction force and are configured for use with an assembly board that may be positioned at an angle to the horizontal While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A routing element for use in a cable harness manufacturing system comprising an assembly board having an attachment surface configured for receiving one or more tooling components to support and locate a cable harness during manufacture, the routing element comprising:

an upper fixture support having at least one aperture for receiving a tooling component; and a lower suction holder comprising at least one suction cup for attaching the routing element to the assembly board, wherein the suction cup comprises a housing, wherein a suction element for applying a suction force at the attachment surface is located in the housing and moveable therein, wherein the housing has a peripheral side wall that extends between an upper surface and lower surface edge of the suction cup, the lower surface edge defining a contact surface of the routing element for contacting the assembly board, wherein the contact surface is configured to provide direct mechanical contact between the lower surface edge and the assembly board when the suction cup is in an activated configuration, the peripheral side wall having a cylindrical form configured in use to extend perpendicular to the attachment surface, to support the suction element, thereby preventing tilting of the suction element relative to the attachment surface, and reducing tilting movement of the suction cup, and wherein the suction element comprises a rubber element providing the required suction force.

2. The routing element of claim 1, wherein each suction cup comprises an actuator for operating the suction cup, the actuator configured such that movement thereof affects movement of the suction element to activate or deactivate a vacuum force at the attachment surface, wherein the actuator comprises a lever or rotatable actuator, and wherein the actuator is located integrally at a support of the routing element.

3. The routing element of claim 1, wherein the at least two suction cups and a support of the routing element are integrally formed.

4. The routing element of claim 1, wherein a portion of the upper fixture support is located between two suction cups on the lower suction holder, the suction cups being spaced apart about a support.

5. The routing element of claim 1, comprising two suction cups arranged at opposing sides of the central vertical axis and the upper fixture support of the routing element.

6. The routing element of claim 1, comprising three suction cups, equally spaced apart about the central vertical axis and the upper fixture support of the routing element.

7. The routing element of claim 1, further comprising one or more guide features defining a guide for orientation or alignment of the routing element, wherein the one or more guide features comprise one or more of: markers, fiducial marks, integrally formed guide features, a reflective coating, a reflective material, and a reflective marker.

8. The routing element of claim 1, wherein at least a portion of the upper fixture support or the lower suction holder is formed of at least partially a transparent material.

9. The routing element of claim 1, further comprising one or more guide features configured to provide a guide for orientation and alignment of the routing element.

10. The routing element of claim 1, wherein a distance between a position of the upper fixture support and the lower suction holder is adjustable.

11. A cable harness manufacturing system comprising:

the routing element according to claim 1; and the assembly board having the attachment surface configured for receiving the routing element to support and locate a cable harness during manufacture.

12. The system of claim 11, further comprising:

a support plate having an upper cable harness facing surface and lower assembly board facing surface, the support plate comprising a plurality of apertures that extend between the upper and lower surfaces thereof, the apertures configured to receive and support a cable fixing element, wherein the support plate is configured for coupling to one or more routing elements, and is configured to be arranged in use in a plane parallel to the plane of the assembly board.

13. The system of claim 12, wherein the support plate is formed of a metal or a polymer material.

14. The system of claim 12, wherein the support plate has at least one property selected from a list consisting of translucent, partially transparent, and transparent.

15. A kit for use in a cable harness manufacturing system comprising an assembly board, having an attachment surface configured for receiving tooling components to support and locate a cable harness during manufacture, the kit comprising:

one or more of the routing elements according to claim 1, wherein the one or more routing elements include:

a support having at least one receiver for receiving the tooling component for supporting the cable harness during manufacture, a lower attachment holder containing at least one suction cup for attaching the routing element to the assembly board;

an orientation guide;

one or more support plates comprising a plurality of apertures configured to receive one or more tooling components and for connection to a receiver of a routing element, wherein the one or more support plates are configured to be connected to one or more routing elements to locate the support plate in use in a plane parallel to that of the attachment surface and spaced apart therefrom; and one or more mating features for receiving and locating one or more routing elements and/or for receiving and locating one or more support plates.

16. The routing element of claim 1, wherein the suction element comprises an upper surface and the housing comprises an opening in which is housed the suction element, wherein the opening comprises an inner surface that is coupled to the upper surface of the suction element when the suction element is moved upward into the opening, and wherein the upper surface is in the form of an inverted cup.

17. The routing element of claim 1, wherein the routing element further comprises a plurality of said suction cups spaced apart about the routing element such that the lower suction holder defines a footprint at the attachment surface that is greater than that of the upper fixture support to provide stability of the routing element at the assembly board, wherein the suction cups are arranged axially about a central vertical axis of the routing element and spaced apart from the upper fixture support, such that the upper fixture support is located centrally between the suction cups.

* * * * *